US008635859B2

(12) United States Patent
Miao et al.

(10) Patent No.: US 8,635,859 B2
(45) Date of Patent: Jan. 28, 2014

(54) SYSTEM AND METHOD FOR DETERMINING A MAXIMUM DOSE RATE OF REDUCTANT

(75) Inventors: Yong Miao, Ann Arbor, MI (US); Kevin Andrew Gady, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 119 days.

(21) Appl. No.: 13/312,212

(22) Filed: Dec. 6, 2011

(65) Prior Publication Data
US 2013/0139488 A1    Jun. 6, 2013

(51) Int. Cl.
*F01N 3/00*    (2006.01)
*F01N 3/10*    (2006.01)

(52) U.S. Cl.
USPC ............ 60/295; 60/274; 60/286; 60/301; 60/303

(58) Field of Classification Search
USPC ........... 60/285, 286, 294, 274, 295, 301, 303
See application file for complete search history.

(56) References Cited

U.S. PATENT DOCUMENTS

| | | | |
|---|---|---|---|
| 6,119,448 A * | 9/2000 | Emmerling et al. | 60/274 |
| 7,200,990 B2 * | 4/2007 | Gabrielsson et al. | 60/286 |
| 7,858,060 B2 | 12/2010 | Gady et al. | |
| 8,413,427 B2 * | 4/2013 | Mullins et al. | 60/286 |

OTHER PUBLICATIONS

Felix Birkhold, et al., "Analysis of the Injection of Urea-Water-Solution for Automotive SCR DeNOx-Systems: Modeling of Two-Phase Flow and Spray/WallI-Interaction", Apr. 3-6, 2006, SAE Technical Paper Series, SAE International, Detroit, MI USA.
Guanya Zheng, et al., "Investigation of Urea Deposits in Urea SCR Systems for Medium and Heavy Duty Trucks", Oct. 5, 2010, SAE International, Detroit, MI USA.

* cited by examiner

*Primary Examiner* — Kenneth Bomberg
*Assistant Examiner* — Audrey K Bradley
(74) *Attorney, Agent, or Firm* — Cantor Colburn LLP

(57) ABSTRACT

An exhaust gas treatment system for an internal combustion engine is provided, having an exhaust gas conduit, a reductant source, a temperature sensor, an intake mass air flow sensor, and a control module. The exhaust gas conduit is in fluid communication with, and is configured to receive an exhaust gas from the internal combustion engine. The exhaust gas contains oxides of nitrogen ("$NO_x$"). The reductant source is in fluid communication with the exhaust gas conduit and is configured for injecting an amount of reductant that is released into the exhaust gas conduit. The temperature sensor is situated in the exhaust stream for determining a temperature of the exhaust gas at the reductant source. The intake mass air flow sensor measures an air mass flow entering the internal combustion engine. The control module is in communication with the reductant source, the temperature sensor, and the intake mass air flow sensor.

20 Claims, 1 Drawing Sheet

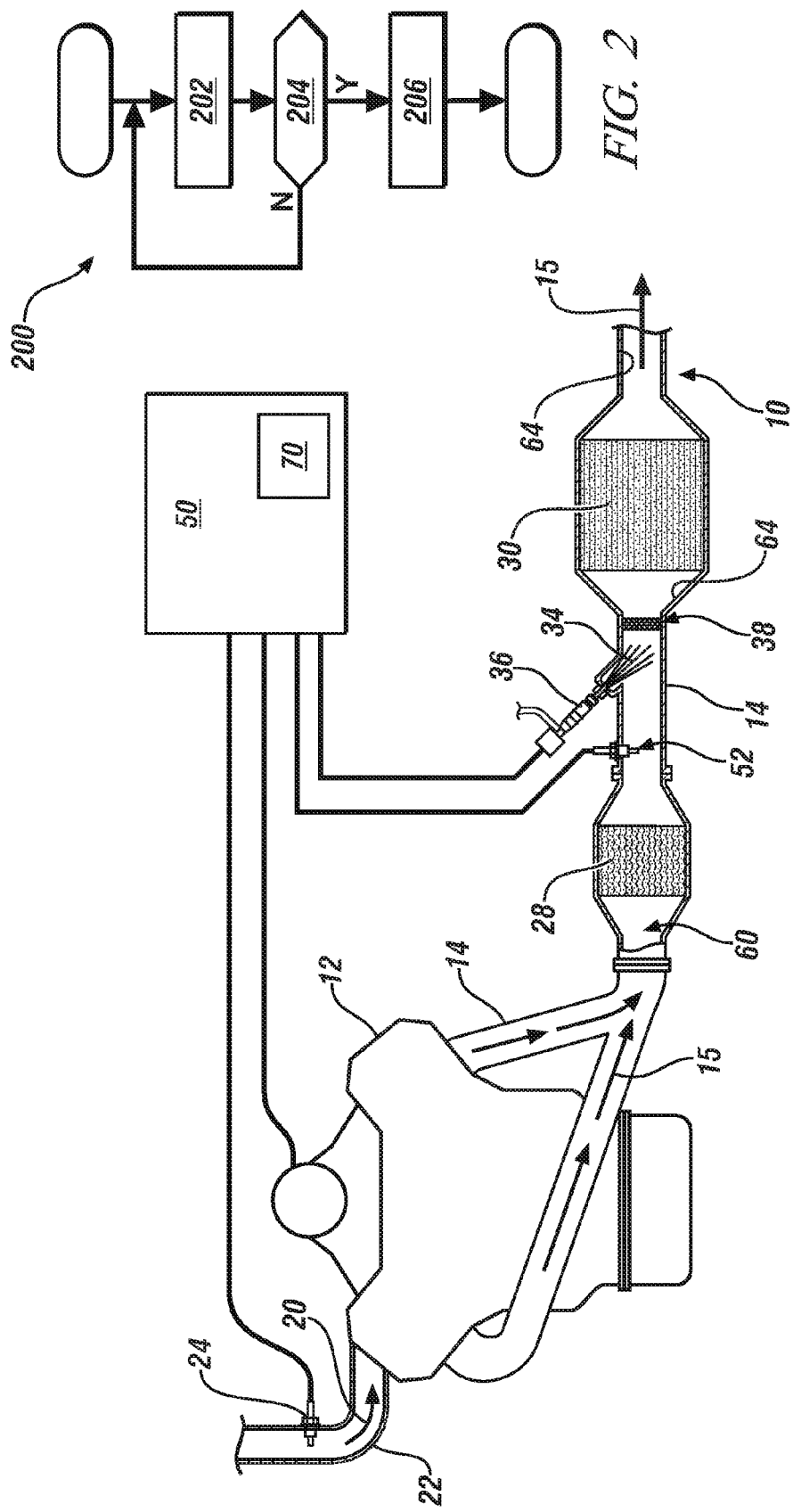

SYSTEM AND METHOD FOR DETERMINING A MAXIMUM DOSE RATE OF REDUCTANT

FIELD OF THE INVENTION

Exemplary embodiments of the invention relate to exhaust gas treatment systems for internal combustion engines and, more particularly, to an exhaust gas treatment system having a control module for calculating a maximum dose rate of reductant released into the exhaust gas.

BACKGROUND

The exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions typically disposed on catalyst supports or substrates are provided in an engine exhaust system to convert certain, or all of these exhaust constituents into non-regulated exhaust gas components.

One type of exhaust treatment technology for reducing $NO_x$ emissions is a selective catalytic reduction ("SCR") device. A reductant is typically sprayed or injected into hot exhaust gases upstream of the SCR device. The reductant may be an aqueous urea solution that decomposes to ammonia ("$NH_3$") in the hot exhaust gases and is absorbed by the SCR device. The ammonia then reduces the $NO_x$ to nitrogen in the presence of the SCR catalyst. The distribution of the reductant upstream of the SCR device in a cross-stream direction has a significant impact on the overall $NO_x$ reduction efficiency by the SCR catalyst. Specifically, the uniformity of the reductant distribution affects the SCR performance, where a more uniform distribution of reductant in the exhaust gas typically results in the SCR catalyst being able to reduce $NO_x$ to nitrogen more effectively. Thus, if the reductant distribution in the exhaust gas is non-uniform, then the SCR catalyst performance may be limited. A non-uniform distribution of reductant may also result in formation of cyanuric acid, melamine, biuret, and other solid reaction products along the inner walls of the exhaust gas piping, which is generally unwanted.

One approach for improving the reductant distribution is to provide multiple mixers or turbulators in the exhaust gas conduit, as well as to increase the length of the exhaust gas conduit. However, this approach adds extra weight, cost, and thermal mass to the exhaust gas system. Accordingly, there exists a need for a cost-effective approach for providing a relatively uniform distribution of reductant to an SCR device.

SUMMARY OF THE INVENTION

In one exemplary embodiment of the invention, an exhaust gas treatment system for an internal combustion engine is provided, having an exhaust gas conduit, a reductant source, a temperature sensor, an intake mass air flow sensor, and a control module. The exhaust gas conduit is in fluid communication with, and is configured to receive an exhaust gas from the internal combustion engine. The exhaust gas contains oxides of nitrogen ("$NO_x$"). The reductant source is in fluid communication with the exhaust gas conduit and is configured for injecting an amount of reductant that is released into the exhaust gas conduit. The temperature sensor is situated in the exhaust stream for determining a temperature of the exhaust gas at the reductant source. The intake mass air flow sensor measures an air mass flow entering the internal combustion engine. The control module is in communication with the reductant source, the temperature sensor, and the intake mass air flow sensor. The control module has a memory that stores a boiling point temperature of the reductant. The control module includes control logic for monitoring the reductant source and determining the amount of reductant that is released into the exhaust gas conduit. The control module includes control logic for monitoring the intake mass air flow sensor and calculating an exhaust flow rate based on the air mass flow. The control module includes control logic for calculating a maximum dose rate of the reductant based on at least the exhaust flow rate, the temperature of the exhaust gas, and the boiling point temperature of the reductant. The control module includes control logic for comparing the amount of reductant that is released into the exhaust gas conduit with the maximum dose rate of the reductant. The control module includes control logic for adjusting the amount of reductant that is released into the exhaust gas conduit if the amount of reductant that is released into the exhaust gas conduit is greater than the maximum dose rate of the reductant.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 1 is a schematic diagram of an exemplary exhaust gas treatment system; and

FIG. 2 is a process flow diagram illustrating a method of calculating a maximum dose rate of reductant for a reductant dosing device shown in FIG. 1.

DESCRIPTION OF THE EMBODIMENTS

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to an exhaust gas treatment system 10, for the reduction of regulated exhaust gas constituents of an internal combustion (IC) engine 12. The engine 12 is configured to receive intake air 20 from an air intake passage 22. The intake air passage 22 includes an intake mass air flow sensor 24 for determining the mass of the intake air mass to the engine 12. In one embodiment, the intake mass air flow sensor 24 may be either a vane meter or a hot wire type intake mass air flow sensor, however, it is to be understood that other types of sensors may be used as well. The exhaust gas treatment system described herein can be implemented in various engine systems that may include, but are not limited to, diesel engine systems, gasoline direct injection systems, and homogeneous charge compression ignition engine systems.

A portion of the exhaust gas treatment system 10 generally includes one or more exhaust gas conduits 14, and one or more exhaust treatment devices. In the embodiment as illustrated, the exhaust gas treatment system devices include an oxidation catalyst device ("OC") 28, and a selective catalytic reduction device ("SCR") 30. As can be appreciated, the exhaust gas treatment system 10 of the present disclosure may include various combinations of one or more of the exhaust treatment devices shown in FIG. 1, and/or other exhaust treatment devices (not shown), and is not limited to the present example. For example, in one embodiment, a particulate filter ("PF") device (not shown) may be located upstream or downstream of the SCR device 30 for filtering the exhaust gas 15 of carbon and other particulates.

The exhaust gas treatment system 10 also includes an ammonia ("$NH_3$") reductant 34 that may be supplied from a reductant supply source (not shown). The reductant 34 may be injected into the exhaust gas conduit 14 at a location upstream of the SCR device 30 using a dosing device such as, for example, an injector 36, or other suitable method of delivery of the reductant to the exhaust gas 15. The reductant 34 may be in the form of an aqueous urea solution and may be mixed with air in the injector 36 to aid in the dispersion of the injected spray. A mixer or turbulator 38 may also be disposed within the exhaust conduit 14 in close proximity to the injector 36 to further assist in thorough mixing of the reductant 34 with the exhaust gas 15.

In FIG. 1, the exhaust gas conduit 14, which may comprise several segments, transports exhaust gas 15 from the IC engine 12 to the various exhaust treatment devices of the exhaust gas treatment system 10. The OC 28 may include, for example, a flow-through metal or ceramic monolith substrate that is packaged in a stainless steel shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum ("Pt"), palladium ("Pd"), rhodium ("Rh") or other suitable oxidizing catalysts, or combination thereof. The OC 28 is useful in treating unburned gaseous and non-volatile HC and CO, which are oxidized to form carbon dioxide and water.

The SCR device 30 may be disposed downstream of the OC device 28. In a manner similar to the OC device 28, the SCR device 30 may include, for example, a flow-through ceramic or metal monolith substrate that may be packaged in a stainless steel shell or canister having an inlet and an outlet in fluid communication with the exhaust gas conduit 14. The substrate may include an SCR catalyst composition applied thereto. The SCR catalyst composition may contain a zeolite and one or more base metal components such as iron ("Fe"), cobalt ("Co"), copper ("Cu") or vanadium ("V") which can operate efficiently to convert $NO_x$ constituents in the exhaust gas 15 in the presence of a reductant 34 such as ammonia.

A control module 50 is operably connected to and monitors the engine 12 and the exhaust gas treatment system 10 through a number of sensors. The control module 50 is also operably connected to the engine 12, the reductant injector 36, and the mass airflow sensor 24. FIG. 1 illustrates the control module 50 in communication with a temperature sensor 52 located in the exhaust gas conduit 14. The temperature sensor 52 is situated upstream of the SCR device 30, and determines the temperature of the exhaust gas $T_{exhaust}$ at the injector 36. The control module 50 includes control logic for monitoring the intake mass air flow sensor 24 for the intake air mass of the engine 12. The control module 50 also includes control logic for monitoring the reductant injector 36 and determining the amount of reductant 34 that is being released or injected into the exhaust gas 15.

The control module 50 further includes control logic for calculating an exhaust flow rate $m_{exhaust}$ located within the exhaust gas conduit 14 at the site of the reductant injector 36. The exhaust flow rate $m_{exhaust}$ is based on the intake air mass of the engine 12, which is measured by the mass airflow sensor 24. Specifically, the exhaust flow of the engine 12 is calculated by adding the intake air mass of the engine 12 and a fuel mass flow of the engine 12. The fuel mass flow is measured by summing the total amount of fuel injected into the engine 12 over a given period of time. The fuel mass flow is added to the air mass flow rate to calculate the exhaust flow rate $m_{exhaust}$ of the engine 12. The exhaust flow rate $m_{exhaust}$ represents the exhaust flow rate $m_{exhaust}$ at an inlet 60 of the OC device 28. It should be noted that because there are generally no exhaust gas losses or mass sinks in the OC device 28, the exhaust flow rate $m_{exhaust}$ at the inlet 60 of the OC device 28 is substantially the same as the exhaust flow rate $m_{exhaust}$ at the site of the reductant injector 36.

The control module 50 includes a memory for storing a boiling point temperature of the reductant 34, and is denoted as $T^*$. For example, in one embodiment the reductant 34 is an aqueous urea solution that has a boiling point temperature $T^*$ of about 103° C.

The memory of the control module 50 also includes an exhaust flow specific heat look-up table. Specifically, the control module includes control logic for determining an exhaust flow specific heat value Cp. The control module 50 monitors the temperature sensor 52, which indicates the temperature of the exhaust gas $T_{exhaust}$ at the reductant injector 36. The control module 50 includes control logic for retrieving an exhaust flow specific heat value Cp from the look-up table based on the temperature of the exhaust gas $T_{exhaust}$ at the reductant injector 36. The memory of the control module 50 further includes a look-up table for storing an enthalpy of the reductant phase change value, which is denoted as $\Delta h_{fg}$. Specifically, the enthalpy of the reductant phase change value is based on the enthalpy of the reductant 34 as the reductant 34 is converted from a liquid form to gas or vapor. The enthalpy of the reductant phase change value $\Delta h_{fg}$ is based on the temperature of the exhaust gas $T_{exhaust}$ at the reductant injector 36. The control module 50 includes control logic for monitoring the temperature of the exhaust gas $T_{exhaust}$ at the reductant injector 36, and retrieves a specific enthalpy of the reductant phase change value $\Delta h_{fg}$ from the look-up table based on the temperature of the exhaust gas $T_{exhaust}$.

The control module 50 includes control logic for calculating a maximum dosing rate $m_{reductant}$ of the reductant 34. The maximum dosing rate $m_{reductant}$ of the reductant 34 is based on a heat input Q from the exhaust gas 15 that is required for the reductant 34 to evaporate. Specifically, in order for the SCR device 30 to effectively reduce $NO_x$ constituents, there is a minimum temperature required or needed of the exhaust gas 15 in order to create reductant evaporation. An equation may be used to express the heat input Q from the exhaust gas as:

$$Q = m_{reductant}\Delta h_{fg} = m_{exhaust}Cp^*(T_{exhaust} - T^*)$$

Based on the equation for the heat input Q, the control module 50 includes control logic for calculating the maximum dose rate of the reductant $m_{reductant}$ using the following equation:

$$m_{reductant} = \frac{m_{exhaust}Cp}{\Delta h_{fg}}(T_{exhaust} - T^*)$$

In one embodiment, the maximum dosing rate $m_{reductant}$ is measured in kg/hour, however, it is understood other units of measure may be used as well.

In one embodiment, the control module 50 includes a dosing module or a sub-module 70 for determining the amount of reductant 34 that is being released into the exhaust gas 15. Alternatively, in another embodiment, the sub-module 70 may be omitted, and the control module 50 includes control logic for determining the amount of reductant 34 that is being released into the exhaust gas 15. The control module 50 then compares the amount of reductant 34 that is being calculated by the control module 50 or the sub-module 70 with the maximum dose rate of the reductant $m_{reductant}$. The control module 50 or the sub-module 70 include control logic for adjusting the amount of reductant 34 that is released into the exhaust gas 15 if the amount of reductant 34 released into the exhaust gas 15 is greater than the maximum dose rate of the reductant $m_{reductant}$. Specifically, the control module 50 or the sub-module 70 include control logic for adjusting the amount of reductant 34 released into the exhaust gas 15 to be the maximum dose rate of the reductant $m_{reductant}$.

The control module 50 monitors the reductant injector 36 to determine if the amount of reductant 34 that is currently being released into the exhaust gas 15 exceeds the maximum dose rate of the reductant $m_{reductant}$. This ensures that the amount of reductant 34 being released into the exhaust gas 15 will not generally create a non-uniform distribution of reductant 34 in the exhaust gas 15, and will not generally result in the formation of solid reaction products along inner walls 64 of the exhaust gas conduit 14. Moreover, the SCR catalyst of the SCR device 30 is generally able to reduce $NO_x$ to nitrogen more effectively when compared to some exhaust gas treatment systems currently available. Limiting the amount of reductant 34 that is currently being released into the exhaust gas 15 to the maximum dose rate of the reductant $m_{reductant}$ may also result in a reduced amount of reductant 34 that is able to pass through the SCR device 30 (which is sometimes referred to as ammonia slip), and also reduces overall consumption of the reductant 34. Finally, limiting the amount of reductant 34 that is currently being released into the exhaust gas 15 to the maximum dose rate of the reductant $m_{reductant}$ may result in fewer mixers or turbulators needed in the exhaust gas conduit 14, and may also decrease the overall length of the exhaust gas conduit 14.

A method of operating the exhaust gas treatment system 10 will now be explained. Referring to FIG. 2, an exemplary process flow diagram illustrating an exemplary process of operating the exhaust gas treatment system 10 is generally indicated by reference number 200. Process 200 begins at step 202, where a control module 50 includes control logic for estimating an amount of a reductant 34 that is released into exhaust gas conduit 14. Specifically, referring to FIG. 1, the amount of the reductant 34 that may be injected into the exhaust gas conduit 14 by a reductant injector 36. In one embodiment, the control module 50 includes a dosing module or a sub-module 70 for determining the amount of reductant 34 that is being released into the exhaust gas 15. Process 200 may then proceed to step 204.

In step 204, the control module 50 includes control logic for comparing the amount of reductant 34 released into the exhaust gas conduit 14 with a maximum dose rate of the reductant $m_{reductant}$. The maximum dosing rate $m_{reductant}$ of the reductant 34 is based on a heat input Q from the exhaust gas 15 that is required for the reductant 34 to evaporate. In the event that the amount of reductant 34 released into the exhaust gas conduit 14 does not exceed the maximum dose rate of the reductant $m_{reductant}$, process 200 may return to step 202. In the event that the amount of reductant 34 released into the exhaust gas conduit 14 is greater than the maximum dose rate of the reductant $m_{reductant}$, process 200 may then proceed to step 206.

In step 206, the control module 50 or the sub-module 70 includes control logic for adjusting the amount of reductant 34 released into the exhaust gas 15 to be the maximum dose rate of the reductant $m_{reductant}$. Process 200 may then terminate, or return to step 202.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system for an internal combustion engine, comprising:
   an exhaust gas conduit in fluid communication with, and configured to receive an exhaust gas from the internal combustion engine, the exhaust gas containing oxides of nitrogen ("$NO_x$");
   a reductant source in fluid communication with the exhaust gas conduit and configured for injecting an amount of reductant that is released into the exhaust gas conduit;
   a temperature sensor situated in the exhaust stream, the temperature sensor being disposed and configured for determining a temperature of the exhaust gas at the reductant source;
   an intake mass air flow sensor for measuring an air mass flow entering the internal combustion engine; and
   a control module in communication with the reductant source, the temperature sensor, and the intake mass air flow sensor, the control module having a memory that stores a boiling point temperature of the reductant, comprising:
      a control logic for monitoring the reductant source and estimating the amount of the reductant that is released into the exhaust gas conduit;
      a control logic for monitoring the intake mass air flow sensor and calculating an exhaust flow rate based on the air mass flow;
      a control logic for determining an enthalpy of a reductant phase change value;
      a control logic for calculating a maximum dose rate of the reductant based on at least the exhaust flow rate, the temperature of the exhaust gas, the enthalpy of the reductant phase change value, and the boiling point temperature of the reductant;
      a control logic for comparing the amount of reductant that is released into the exhaust gas conduit with the maximum dose rate of the reductant; and
      a control logic for adjusting the amount of reductant that is released into the exhaust gas conduit if the amount of reductant that is released into the exhaust gas conduit is greater than the maximum dose rate of the reductant.

2. The exhaust gas treatment system of claim 1, wherein the control module includes control logic for adjusting the amount of reductant that is released into the exhaust gas conduit to be the maximum dose rate of the reductant.

3. The exhaust gas treatment system of claim 1, further comprising a selective catalytic reduction ("SCR") device in fluid communication with the exhaust gas conduit and configured to receive the exhaust gas, the SCR device receiving the reductant from the reductant source to convert the reductant and NO$_x$ in the exhaust gas into intermediates.

4. The exhaust gas treatment system of claim 1, wherein the reductant source is a reductant injector.

5. The exhaust gas treatment system of claim 1, wherein the reductant is urea.

6. The exhaust gas treatment system of claim 1, wherein the control module includes a sub-module, and wherein the sub-module includes the control logic for estimating the amount of reductant that is released into the exhaust gas conduit.

7. The exhaust gas treatment system of claim 1, wherein the memory of the control module includes an exhaust flow specific heat look-up table, and wherein an exhaust flow specific heat value is based on the temperature of the exhaust gas at the reductant source.

8. The exhaust gas treatment system of claim 7, wherein the memory of the control module includes an enthalpy of the reductant phase change look-up table, wherein the enthalpy of the reductant phase change value is based on as the reductant changes from liquid to vapor, and wherein the enthalpy of the reductant phase change value is based on the temperature of the exhaust gas at the reductant source.

9. The exhaust gas treatment system of claim 8, wherein the control module includes control logic for calculating the maximum dose rate of the reductant based on the following equation:

$$m_{reductant} = \frac{m_{exhaust} Cp}{\Delta h_{fg}} (T_{exhaust} - T^*)$$

wherein $m_{reductant}$ is the maximum dose rate of the reductant, $m_{exhaust}$ is the exhaust flow rate, Cp is the enthalpy of the reductant phase change value, $\Delta h_{fg}$ is the enthalpy of the reductant phase change value, $T_{exhaust}$ is the temperature of the exhaust gas, and T* is the boiling point temperature of the reductant.

10. A method of operating an exhaust gas treatment system for an internal combustion engine, the exhaust gas treatment system having an exhaust gas conduit in fluid communication with, and configured to receive an exhaust gas from the internal combustion engine, comprising:
monitoring a reductant source and estimating an amount of reductant that is released into the exhaust gas conduit by a control module;
determining a temperature of the exhaust gas at the reductant source;
monitoring an intake mass air flow sensor by the control module, the intake mass air flow sensor measuring an air mass flow entering the internal combustion engine;
calculating an exhaust flow rate based on the air mass flow;
determining an enthalpy of a reductant phase change value;
calculating a maximum dose rate of the reductant based on at least the exhaust flow rate, the temperature of the exhaust gas, the enthalpy of the reductant phase change value, and a boiling point temperature of the reductant, the boiling point temperature stored in a memory of the control module;
comparing the amount of reductant that is released into the exhaust gas conduit with the maximum dose rate of the reductant; and
adjusting the amount of reductant that is released into the exhaust gas conduit if the amount of reductant that is released into the exhaust gas conduit is greater than the maximum dose rate of the reductant.

11. The method of claim 10, comprising adjusting the amount of reductant that is released into the exhaust gas conduit to be the maximum dose rate of the reductant.

12. The method of claim 10, comprising including an exhaust flow specific heat look-up table that is stored in the memory of the control module, wherein an exhaust flow specific heat value is based on the temperature of the exhaust gas at the reductant source.

13. The method of claim 12, including an enthalpy of the reductant phase change look-up table that is stored in the memory of the control module, wherein the enthalpy of the reductant phase change value is based on as the reductant changes from liquid to vapor, and wherein the enthalpy of the reductant phase change value is based on the temperature of the exhaust gas at the reductant source.

14. The method of claim 13, comprising calculating the maximum dose rate of the reductant based on the following equation:

$$m_{reductant} = \frac{m_{exhaust} Cp}{\Delta h_{fg}} (T_{exhaust} - T^*)$$

wherein $m_{reductant}$ is the maximum dose rate of the reductant, $m_{exhaust}$ is the exhaust flow rate, Cp is the enthalpy of the reductant phase change value, $\Delta h_{fg}$ is the enthalpy of the reductant phase change value, $T_{exhaust}$ is the temperature of the exhaust gas, and T* is the boiling point temperature of the reductant.

15. An exhaust gas treatment system for an internal combustion engine, comprising:
an exhaust gas conduit in fluid communication with, and configured to receive an exhaust gas from the internal combustion engine, the exhaust gas containing oxides of nitrogen ("NO$_x$");
a reductant source in fluid communication with the exhaust gas conduit and configured for injecting an amount of reductant that is released into the exhaust gas conduit;
a temperature sensor situated in the exhaust stream, the temperature sensor being disposed and configured for determining a temperature of the exhaust gas at the reductant source;
an intake mass air flow sensor for measuring an air mass flow entering the internal combustion engine; and
a control module in communication with the reductant source, the temperature sensor, and the intake mass air flow sensor, the control module having a memory that stores a boiling point temperature of the reductant, comprising:
a control logic for monitoring the reductant source and estimating the amount of reductant that is released into the exhaust gas conduit;
a control logic for monitoring the intake mass air flow sensor and calculating an exhaust flow rate based on the air mass flow;
a control logic for determining an enthalpy of a reductant phase change value;
a control logic for calculating a maximum dose rate of the reductant based on at least the exhaust flow rate, the temperature of the exhaust gas, the enthalpy of the reductant phase change value, and the boiling point temperature of the reductant;
a control logic for comparing the amount of reductant that is released into the exhaust gas conduit with the maximum dose rate of the reductant; and a control logic for adjusting the amount of reductant that is released into the exhaust gas conduit if the amount of reductant that is released into the exhaust gas conduit is greater than the maximum dose rate of the reductant such that the amount of reductant that is released into the exhaust gas conduit is the maximum dose rate of the reductant.

16. The exhaust gas treatment system of claim 15, further comprising a selective catalytic reduction ("SCR") device in fluid communication with the exhaust gas conduit and configured to receive the exhaust gas, the SCR device receiving the reductant from the reductant source to convert the reductant and $NO_x$ in the exhaust gas into intermediates.

17. The exhaust gas treatment system of claim 15, wherein the reductant source is a reductant injector.

18. The exhaust gas treatment system of claim 15, wherein the memory of the control module includes an exhaust flow specific heat look-up table, and wherein an exhaust flow specific heat value is based on the temperature of the exhaust gas at the reductant source.

19. The exhaust gas treatment system of claim 18, wherein the memory of the control module includes an enthalpy of the reductant phase change look-up table, wherein the enthalpy of the reductant phase change value is based on as the reductant changes from liquid to vapor, and wherein the enthalpy of the reductant phase change value is based on the temperature of the exhaust gas at the reductant source.

20. The exhaust gas treatment system of claim 19, wherein the control module includes control logic for calculating the maximum dose rate of the reductant based on the following equation:

$$m_{reductant} = \frac{m_{exhaust} Cp}{\Delta h_{fg}} (T_{exhaust} - T^*)$$

wherein $m_{reductant}$ is the maximum dose rate of the reductant, $m_{exhaust}$ is the exhaust flow rate, $Cp$ is the enthalpy of the reductant phase change value, $\Delta h_{fg}$ is the enthalpy of the reductant phase change value, $T_{exhaust}$ is the temperature of the exhaust gas, and $T^*$ is the boiling point temperature of the reductant.

* * * * *